(12) United States Patent
Cole, III et al.

(10) Patent No.: US 6,392,192 B1
(45) Date of Patent: May 21, 2002

(54) REAL TIME CONTROL OF LASER BEAM CHARACTERISTICS IN A LASER-EQUIPPED MACHINE TOOL

(75) Inventors: Ira E. Cole, III, Rockford; William B. Scott, Rochelle, both of IL (US)

(73) Assignee: W. A. Whitney Co., Rockford, IL (US)

( * ) Notice: Subject to any disclaimer, the term of this patent is extended or adjusted under 35 U.S.C. 154(b) by 0 days.

(21) Appl. No.: 09/396,954

(22) Filed: Sep. 15, 1999

(51) Int. Cl.$^7$ ............................................. B23K 26/02
(52) U.S. Cl. ........................... 219/121.83; 219/121.63; 219/121.64; 219/121.62
(58) Field of Search ..................... 219/121.83, 121.63, 219/121.64, 121.62

(56) References Cited

U.S. PATENT DOCUMENTS

| | | | | |
|---|---|---|---|---|
| 5,118,918 A | * | 6/1992 | Serrano | 219/121.78 |
| 5,136,136 A | | 8/1992 | Karube et al. | 219/121.73 |
| 5,374,803 A | | 12/1994 | Yamada | 219/121.72 |
| 5,399,835 A | * | 3/1995 | Nakata | 219/121.78 |
| 5,442,436 A | * | 8/1995 | Lawson | 356/153 |
| 5,444,211 A | | 8/1995 | Nakata et al. | 219/121.67 |
| 5,493,095 A | | 2/1996 | Bruschi et al. | 219/121.75 |

(List continued on next page.)

FOREIGN PATENT DOCUMENTS

| | | | |
|---|---|---|---|
| GB | 2327277 A | 1/1999 | |
| JP | 4167990 A | * 6/1992 | ............ B23K/6/04 |
| JP | 040167990 | 6/1992 | ............ B23K/26/04 |
| JP | 070185861 | 7/1995 | ............ B23K/26/06 |
| JP | 100066088 | 3/1998 | ............ H04N/7/32 |

OTHER PUBLICATIONS

Optimizing Cutting and Welding Processing by Controlling the Laser Beam, D. Christopher Hermanns, presented in Lasers in the Workpiece Session at Manufacturing '96 Conference.

(List continued on next page.)

*Primary Examiner*—M. Alexandra Elve
(74) *Attorney, Agent, or Firm*—Leydig, Voit & Mayer, Ltd.

(57) ABSTRACT

A method and apparatus for real time control of laser beam characteristics in a high power laser-equipped machine tool. A beam path input signal is produced related to changes in the length of the laser beam path as the processing head of the machine tool moves over the workpiece. An integrator produces a signal related to the real time changes in thermal loading of the laser output coupler as the laser beam is applied and as the output power level is adjusted. The beam path and thermal loading signals are used to drive a collimator so as to correct in real time for altered beam characteristics introduced by path length changes and thermal lensing of the output coupler. The result is to maintain control of the beam size at the focus optic. In addition, a further integrator produces a signal related to the real time changes in thermal loading of the focal optic as the laser beam is applied and as the input laser power level is adjusted. This correction signal is applied to the focus optic adjustment mechanism to correct in real time for any shift in the focus optic caused by thermal lensing of that optic.

13 Claims, 6 Drawing Sheets

U.S. PATENT DOCUMENTS

| | | | | |
|---|---|---|---|---|
| 5,517,420 A | * | 5/1996 | Kinsman et al. | 364/474.08 |
| 5,607,606 A | | 3/1997 | Mori et al. | 219/121.67 |
| 5,637,243 A | | 6/1997 | Sato et al. | 219/121.67 |
| 5,667,707 A | * | 9/1997 | Klingel et al. | 219/121.67 |
| 5,670,064 A | * | 9/1997 | Nakata | 219/121.6 |
| 5,756,961 A | | 5/1998 | Sato et al. | 219/121.67 |
| 5,777,807 A | | 7/1998 | Bar et al. | 359/845 |
| 5,841,125 A | | 11/1998 | Livingston | 250/201.9 |
| 5,889,256 A | | 3/1999 | Osanai | 219/121.74 |
| 5,961,859 A | * | 10/1999 | Chou et al. | 219/121.63 |
| 6,128,138 A | * | 10/2000 | Cole, III | 359/641 |

OTHER PUBLICATIONS

Bestform Laser Lenses, Special Optics Magazine.
High Power $CO_2$ Laser Beam Collimator, II–VI Incorporated Brochure.
Lasers, Anthony E. Siegman, University Science Books.
Achieving Consistent Results in Laser Cutting Thick Plate, Published in the Fabricator May 1996, Dennis Ebner.
Laser Cutting Heavy Plate Published in Industrial Laser Review, Aug. 19095, Stephen Hicks and Norine Weiss.
Beam Expander–Condensers, II–VI Incorporated.

* cited by examiner

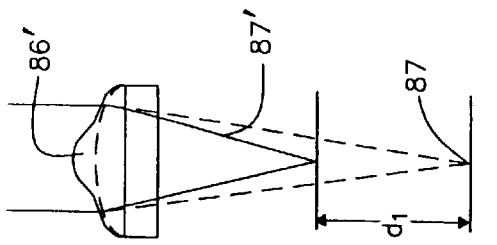
Fig. 4c
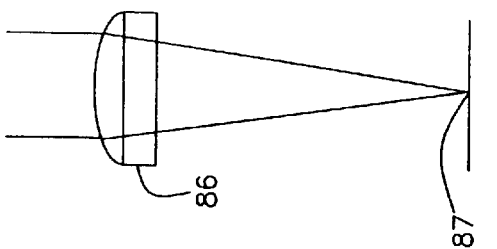
Fig. 4d
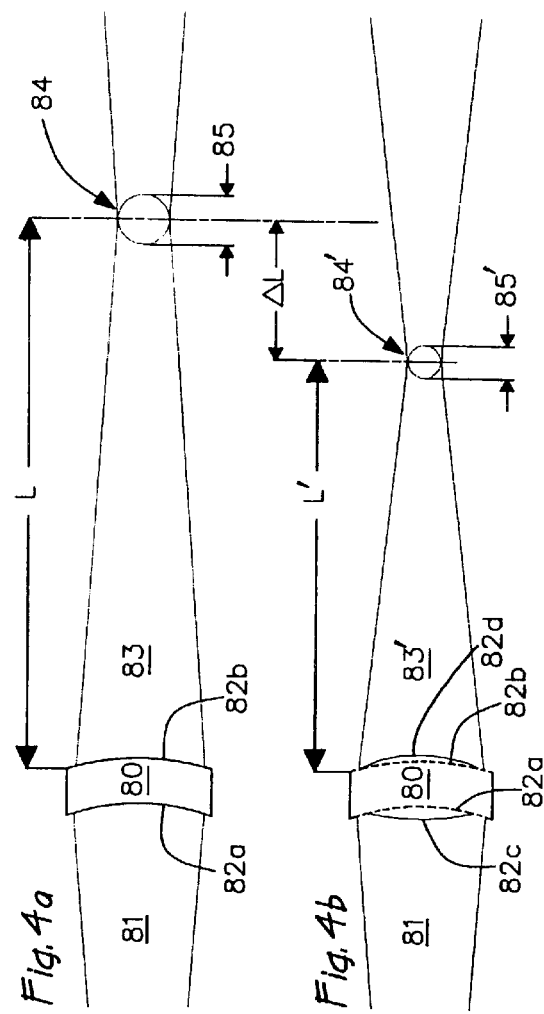
Fig. 4a
Fig. 4b
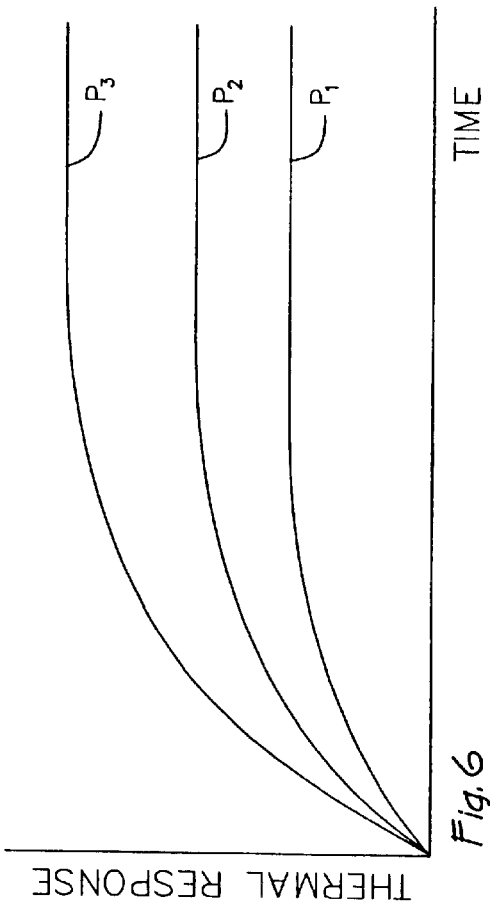
Fig. 6
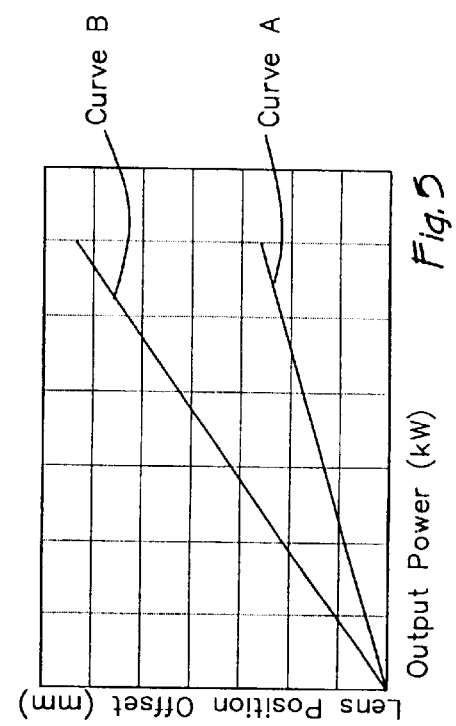
Fig. 5

REAL TIME CONTROL OF LASER BEAM CHARACTERISTICS IN A LASER-EQUIPPED MACHINE TOOL

FIELD OF THE INVENTION

The present invention generally relates to laser-equipped machine tools, and more particularly relates to real time control of laser beam characteristics for improved machine tool performance.

BACKGROUND OF THE INVENTION

Laser-equipped machine tools are often used to cut parts from sheet metal and relatively thin plate. They are also used to weld together cut and machined parts. In such machine tools, a laser beam is employed to process the material. A laser beam, also simply referred to as a beam, is directed along a beam path via a beam delivery system. A beam delivery system is a collection of optical elements, such as reflective mirrors and transmissive optics, which may redirect the beam, alter the propagation characteristics of the beam or focus the beam. The beam delivery system is enclosed for safety and for control of the beam path environment within. The laser beam is concentrated by a focusing lens or mirror to a small diameter spot, which is directed to an appropriate position relative to the surface of the material to be processed.

In most implementations, the laser beam exits the laser through an output coupler, a partially transmissive and partially reflective optical element which seals the laser cavity and transmits a portion of the beam out of the laser cavity or resonator. The beam is then directed along a beam path to a focusing optic in a processing head near the work. In most cutting applications, the beam is directed by the focusing optic through a nozzle disposed immediately above the workpiece to be cut. A pressurized gas is also directed through the nozzle, typically coaxial to the beam, to assist the cutting process The pressurized gas serves to facilitate and/or shield the cutting process, and creates a gas stream which helps remove vaporized and molten material from the cut or kerf. Kerf refers to the zone of material which is acted upon and removed by a cutting process. Kerf width refers to the width of the slot created by the cutting process, such as the width of the slot cut by a laser beam as it moves along a path.

Key factors in laser processing include the diameter of the focus spot and the position of the focus relative to the material to be processed. The control of these focal characteristics is critical to maintaining the quality of the process. During processing, unintended deviation in the focus size and position may produce a deterioration in process quality and may even cause the process to fail.

The first of two main factors which influence the focus characteristics is the diameter of the laser beam at the focal optic. Due to diffraction, the minimum focal spot diameter, for a given focal length optic, is limited. Diffraction causes light beams to diverge or spread transversely as they propagate. As the input laser beam diameter increases for a given focal optic, the focus spot diameter decreases due to a decrease in diffraction. In addition, as the input laser beam diameter increases for a given focal optic, the focus spot position shifts closer to the focus optic.

The raw laser beam, issuing from the laser resonator, exhibits the characteristic of divergence. The beam diameter will change as a function of the distance from the output coupler. Typically, as the processing head moves over the processing area the distance from the output coupler to the focal optic will change. When a large processing area is required, some method of maintaining the proper beam diameter must be employed in order to avoid significant changes in focus diameter and position.

Additionally, changes in the output power level of the laser will affect the divergence of the output beam. The largest effect on beam divergence comes from the thermal loading of the output coupler which produces thermal lensing. Thermal lensing is distortion of an optical component caused by heat absorbed from the input beam. The absorbed portion of the beam causes expansion of the output coupler such that the curvature of the surface changes. The expansion causes a change in the divergence of the output beam thereby changing the beam size at any given distance from the output coupler. The rate and amount of distortion is dependent upon the power of the beam, optic contamination, thermal conductivity of the optic and its cooling system and the length of time the beam is applied. Upon reaching thermal equilibrium, when absorbed heat is in balance with that removed by the lens cooling system, the shape of the optic surface remains constant. When the beam is turned off, the optic surface gradually relaxes and returns to its original shape. When a high output power laser is required, some method of maintaining the proper beam diameter, in a time dependent response to output power changes, must be employed if significant changes in focus diameter and position are to be avoided.

The second of two main factors which influence the focus characteristics is the distortion of the focus optic due to heat absorption. In a manner similar to that described for the laser output coupler, thermal lensing occurs in the focus optic. The expansion of the focus optic reduces the effective radius of curvature which causes the focal spot to shift closer to the focal optic. When a high output power laser is required, some method of maintaining the proper focal position, in a time dependent response to input laser power changes, must be employed if significant changes in focus position are to be avoided.

Laser-equipped machine tools are typically Computer Numerically Controlled (CNC) and are manufactured in many configurations and sizes and with lasers of various types and power. Generally speaking, there are two beam delivery configurations utilized: those with a fixed length between the laser output coupler and the processing head and those with a variable path length between the laser output coupler and the processing head.

In one cutting machine configuration, typically called "flying optics," the cutting head is adapted for movement along one axis, such as the Y-axis, which is mounted on a bridge adapted for movement in an orthogonal X-axis. The work is supported on a stationary pallet or table below the bridge. Movement of the cutting head is coordinated with movement of the bridge to define a precise path on the part. The cutting head and laser are controlled to pierce and cut the material, to form holes and shapes in the material and to cut the part from the material. Such machines can be configured with either a fixed length or a variable length beam path.

In a cutting machine configured with flying optics, a fixed length beam path is typically created in one of two ways. In one method, the beam path between the output coupler and the processing head consists of sections of tubular arms. The arm sections are connected via pivotable joints containing preloaded bearings with mirrors at the entrance and exit to steer the beam. As the process head moves, the tubular sections translate and pivot about the joints to follow the motion. While the fixed beam path length of such a system eliminates divergence problems due to path length, there remain concerns about the ability of the system to withstand high acceleration forces. Such a system also poses some difficulty with regard to adequately supporting the arms.

Another fixed length beam path approach is to provide an additional axis within the beam path and coordinate its movement to compensate for the positioning of the cutting head such that the length of the beam path does not change. One control means for such a system is disclosed in Fanuc Ltd. U.S. Pat. No. 5,406,048. Other methods are also in use.

On some machines, such as a "gantry" cutting machine, in which the laser is carried, this fixed length concept is relatively easy to implement. The machine consists of floor-mounted rails or ways about two parallel sides of a fixed table which supports the work. The rails carry a platform on which the laser is mounted. The rails also carry a gantry or bridging section over the work. Typically the laser-mounting platform is located over one of the rails such that the beam exits the laser parallel to the rails. The beam is directed by a mirror to a mirror mounting platform at the far side of the gantry beyond the cutting head. That platform has typically two mirrors mounted so as to direct the beam back to another mirror mounted on the cutting head directly over the focusing lens. The cutting head is at its closest position relative to the mirror mounting platform when the head is at its extreme travel position toward the far side of the gantry away from the laser output coupler. Movement of the cutting head on the gantry is coordinated with movement of the gantry on the rails. As the cutting head moves on the gantry, the platform with the two mirrors is coordinated to move with it, but travels half the distance of the cutting head. When the cutting head is at it's extreme travel position nearest to the laser, the platform carrying the two turning mirrors has traveled to the approximate center of the gantry. In such manner the total length of the beam path does not change. This compensation means is often referred to as a "trombone" due to the similarity of the shape of the beam path and the compensating movement to the shape and movement of the musical instrument. Such a system is difficult to implement on a flying optic machine as it is difficult to locate the trombone elements such that they do not interfere with other machine elements or with other functions such as loading and unloading material. The trombone optics must travel a greater distance on a flying optic machine as both the X-axis and Y-axis motion must be compensated. Supplying the mirror mounting platform, ways, a servo controlled drive system and machining mounting surfaces add significantly to the cost of such a machine.

One method employed to reduce the divergence of the laser beam is to expand or magnify it with a collimator. The rate of divergence of a beam is reduced in inverse proportion to the amount it is magnified. If a beam is magnified by 125 percent its rate of divergence is reduced 20 percent. If it is magnified by 200 percent its rate of divergence is reduced by 50 percent.

Collimators are optical devices, also known as beam expanders and condensers. Such devices also have other characteristics and functions known to those skilled in the art. Manufacturers of laser optics publish literature providing information on design variations and examples of use. One example of such literature is the II–IV Incorporated publication, Beam Expander-Condensers, published March 1992. Collimators can be constructed of transmissive optics such that the beam is passed through the optics. Such collimators are commonly used in laser-equipped machines up to about three kilowatt power levels and sometimes above.

Collimators used on low powered lasers are designed or adjusted to magnify the beam a given amount and then locked in place. Use of transmissive collimators with lasers having power levels above three kilowatts becomes increasingly problematic due to thermal lensing and due to limits on the energy density that transmissive optic materials can withstand. Impurities within optical materials, crystal growth conditions, surface contamination and surface imperfections are primary causes for a portion of a laser beam to be absorbed and converted to heat within a transmissive optical element.

The distortion produced by thermal lensing can influence the divergence and mode quality of the beam passing through or reflecting off of the optical delivery and focusing components and thereby cause detrimental shifts of focus position. Thermal lensing is a greater problem with transmissive optics. For example, when a high power beam is directed at the curved surface of a plano-convex focal lens, which has a curved first surface and a flat second surface, the absorbed portion of the beam causes expansion of the lens such that the curvature of the surface changes. The expansion reduces the effective radius of curvature which causes the focal spot to shift upward or closer to the lens. The rate of curvature change is greater toward the center of the lens due to the power distribution of the incident laser beam. Therefore, the heating and the expansion is greater toward the center of the lens. Fixed collimators constructed of transmissive optics are very susceptible to thermal lensing which reduces their effectiveness for use with high power lasers.

Collimators are also constructed of reflective optics, combinations of flat and shaped mirrors, such that the light beam is reflected from the optical elements. Reflective optical elements are typically manufactured from materials, such as copper, which can withstand greater energy densities without damage. Also, thermal lensing is not as severe in reflective optics as compared to transmissive optics. Thus reflective collimators are more suitably used in high power laser applications. However, a fixed, reflective collimator cannot compensate for the thermal lensing of a laser output coupler nor for the thermal lensing of a focal optic.

SUMMARY OF THE INVENTION

In view of the foregoing, it is a general aim of the invention to provide a high power laser-equipped machine tool having real time compensation of the beam size at the focusing optic and the position of the focal spot in relation to the surface of the material processed.

Stated differently, a general aim of the present invention is to provide a control system for a high power laser-equipped machine tool which is capable of adjusting optical elements in real time to maintain the focal spot size and desired position in relation to the material being processed.

A specific object of the invention is to provide a control system in which the control is real time and compensates for changes due to thermal lensing and for changes in beam path length.

In greater detail, it is an object of the invention to provide a control system for use with a servo driven precision collimator in a machine tool equipped with a high power laser, the system being adapted to introduce collimator corrections compensating for both path length changes and the thermal loading of system optics.

Stated more broadly, an object of the present invention is to provide a laser system for a machine tool in which system repeatability is enhanced by automatically, and without operator intervention, compensating for the effects on the focal spot size and location relative to the work which are introduced by beam path length changes and by the amount of power on the optical elements and the duration or frequency it is on or off, such that compensating corrections are made in real time during system operation.

Another object of the invention is to provide a real time control system for a high power laser-equipped machine tool having a transmissive focusing optic, the system being capable of compensating for changes in beam characteristics by way of a collimator and for changes introduced by the focusing optic by adjustment of the focusing optic.

It is another object of the invention to provide a control system for a high power laser-equipped machine tool having means to determine the power on the transmissive focusing optic, consider the position of the transmissive focusing optic and to respond in real time to correct the position of the lens to compensate for diffraction in and thermal lensing of the focal lens.

Another specific object of the invention according to a preferred implementation is to provide a real time control system for a high power laser-equipped machine tool having a variable length beam path and a transmissive focusing optic, to compensate for variations in the beam characteristics by using a servo controlled collimator and to compensate for changes introduced by the focusing optic by adjusting the focusing optic.

Thus, it is an objective to have the respective compensating mechanisms working in tandem to produce a consistent and repeatable beam focus spot size and position.

It is a feature of the invention that a real time control system is provided for a high power laser-equipped machine tool of the type having a variable length beam path, the system being capable of maintaining the size and diametrical characteristics of a laser beam at a focal lens, and also for maintaining the position of a focal spot in relation to the surface of the material processed.

It is a further feature of the invention that in real time separate integrators follow the thermal loading of the laser output coupler and of the focal lens with respective time constants associated with the integrators which match the thermal distortion and relaxation rate of the respective optic and that compensation values are determined from the integrator outputs and introduced into the respective drive system of the collimator and focal positioning system such that the size and position of the focal spot relative to the work processed is accurately maintained regardless of the position of the processing head within its range of travel and regardless of the amount of laser power on the optics and regardless of the duration or frequency that the beam is on or off.

It is advantageous that such a system utilize a servo controlled reflective collimator. Such a collimator is disclosed and claimed in commonly owned co-pending application Ser. No. 09/353,936, in the name of Ira E. Cole III entitled Reflective Laser Collimator.

It is also advantageous that such a system utilize a cutting head which is relatively light in weight and easily maneuverable, has a servo controlled drive to position the cutting nozzle appropriately relative to the work, has a separate servo controlled vertical adjustment drive to position its optic carrier with focusing optic and which includes a counterbalancing system, balancing the reactive forces directed on a focal optic by high pressure assist gas. Such a cutting head is disclosed and claimed in commonly owned co-pending application Ser. No. 09/302,279, in the name of John C. Legge entitled Laser-Equipped Machine Tool Cutting Head with Pressurized Counterbalance.

These and other objectives and features of the invention will become more apparent from the following detailed description when taken in conjunction with the accompanying drawings.

BRIEF DESCRIPTION OF THE DRAWINGS

FIGS. 4a–4d are diagrams illustrating the phenomenon of thermal lensing;

FIG. 5 is a diagram illustrating focal position offset as a function of steady state output power for two typical focusing lenses;

FIG. 6 is a diagram illustrating the rate at which a lens will absorb energy from an incident laser beam at different power levels, and thus change in size and transmissive characteristics;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
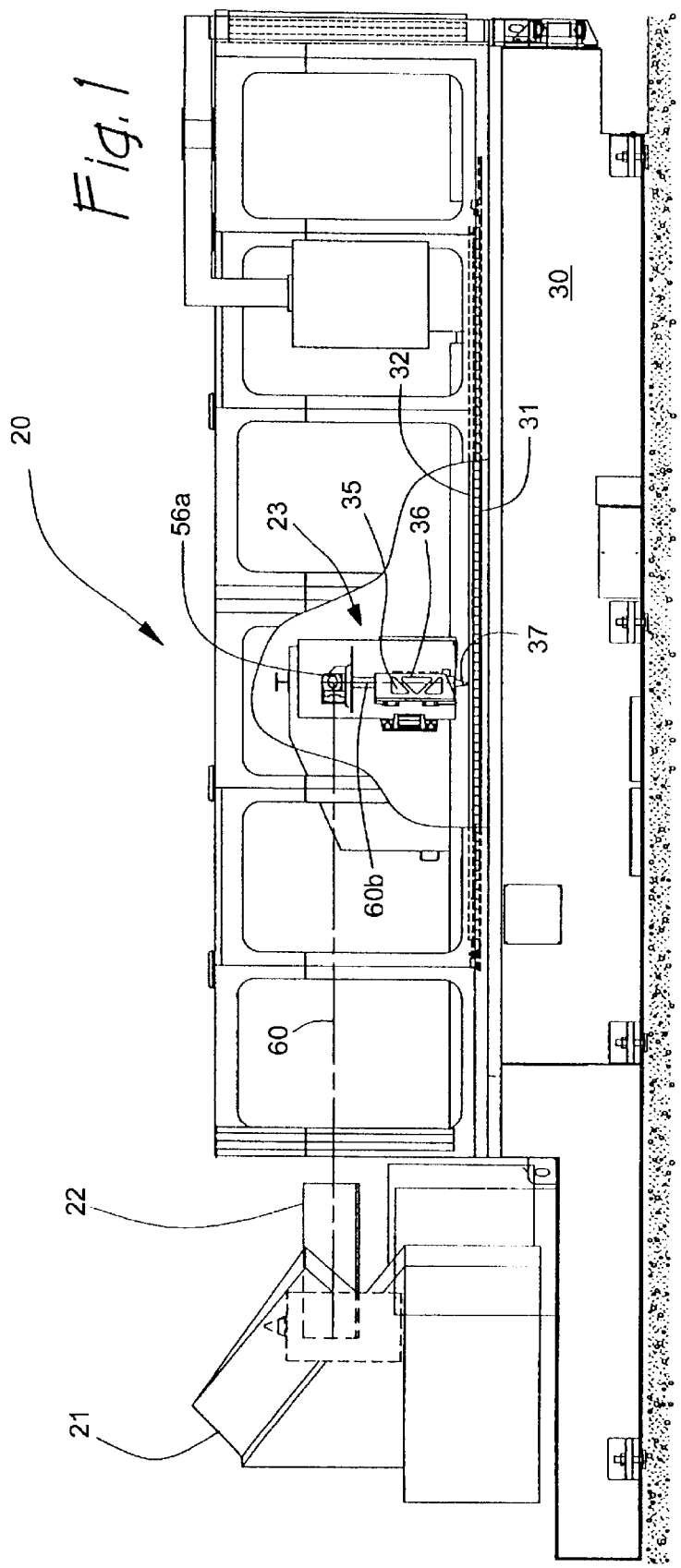
FIG. 1 is a front elevation, partly simplified and partly broken away, showing a laser-equipped machine tool in which the present invention can be embodied.
Figure 2:
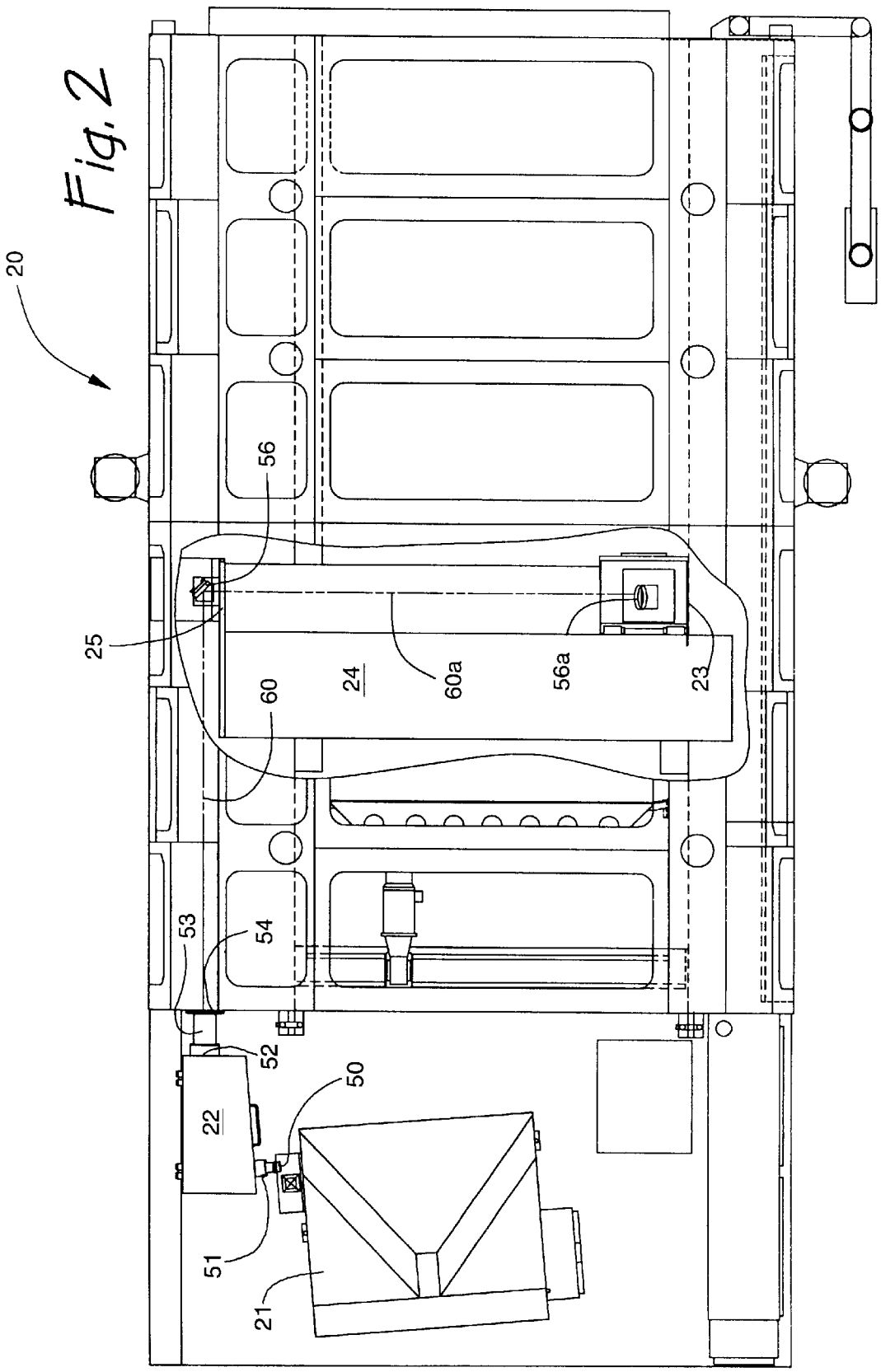
FIG. 2 is a plan view of the machine of FIG. 1.

Turning now to the drawings, FIGS. 1 and 2 illustrate a preferred environment for a control system in accordance with the present invention. The environment is shown as a laser-equipped cutting machine. However, the principles of beam control will also be suitable for a laser-equipped welding machine, as those skilled in the art will appreciate upon reviewing this specification. In the illustrated embodiment, a laser cutting machine tool 20 includes a collimator 22 interposed between a laser source 21 and a cutting head indicated generally at 23. Briefly, laser cutting machine 20 consists of a base 30 which supports a worktable 31 on which rests a work piece 32. The laser source 21 will not be described in any detail except to note that in this case it is a high power device producing a beam having over 3 kilowatts of power.

Cutting head 23 includes an optical housing 35 which houses a focusing optic 36. Focusing optic 36 (see FIG. 3 for slots 36a in which the optic is carried) is mounted in a holder which is mounted in the optical housing or carrier 35. Laser source 21 delivers a high power laser beam to collimator 22 which directs a collimated beam 60 to first bending mirror 56, then to second bending mirror 56a mounted above cutting head 23, and then to focusing optic 36. The laser beam is directed from focusing optic 36 through nozzle 37 disposed immediately above the workpiece. Pressurized gas is also directed through nozzle 37, coaxially to the laser beam, to assist the cutting process. The pressurized gas serves to facilitate and/or shield the cutting process, and creates a gas stream which helps remove vaporized and molten material from the cut.

Cutting head 23 is adapted for movement along one axis, here called the Y-axis which is mounted to bridge 24. Bridge 24 is adapted for movement along an orthogonal X-axis. The workpiece or plate 32 is supported on a pallet or table 31 below bridge 24. Movement of cutting head 23 is coordinated with movement of bridge 24 to define a precise path on plate 32. Laser 21 and cutting head 23 are controlled to pierce and cut holes and shapes and then the boundary of a part from the plate 32. It should be noted that this "flying optics" configuration, is not the only configuration to which the present invention can be applied. The invention has broader applicability. The machine tool illustrated in FIGS. 1 and 2 is simply an exemplary embodiment.

Figure 3:
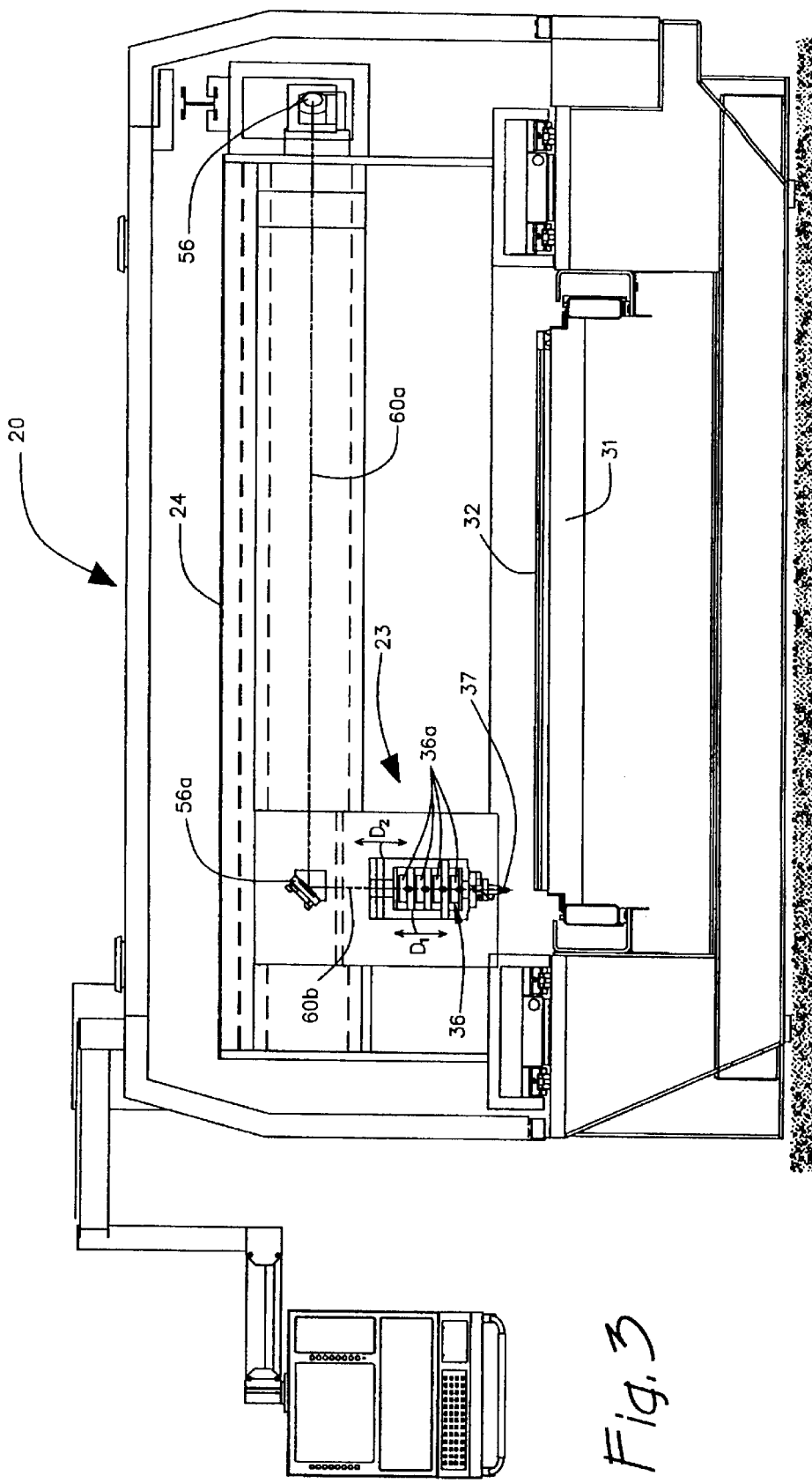
FIG. 3 is an end elevation of the machine of FIG. 1.

Cutting head 23 traverses the full length of the worktable 31 (left to right as shown in FIG. 2) and the full width of the worktable 31 (top to bottom as shown in FIG. 2 or left to right as shown in FIG. 3). Those boundaries define the cutting area and the maximum size workpiece 32 that the machine can process. With this machine configuration the length of the laser beam path between the laser output coupler and the focusing optic in cutting head 23 changes as the cutting head 23 moves over the cutting area.

As best shown in FIG. 2, beam 60 is directed from collimator 22 to bending mirror 56 which is attached to the end of bridge 24 by way of panel 25. Mirror 56 moves with bridge 24 such that the distance between collimator 22 and mirror 56 is variable and dependent on the position of bridge 24 within its length of travel.

As best shown in FIGS. 2 and 3, beam 60a is beam 60 reflected from mirror 56 to mirror 56a mounted above cutting head 23. Mirror 56a moves with cutting head 23 such that the distance between mirror 56 and mirror 56a and thus the length of beam path 60a is variable and dependent on the position of cutting head 23 within its length of travel.

As best shown in FIG. 3, beam 60b is beam 60a reflected from mirror 56a through lens 36 and nozzle 37 to the workpiece 32. Cutting head 23 is shown in a retracted position above the work. Nozzle 37 would typically be positioned within a few mm above the surface of the work 32 when cutting. The length of beam 60b is variable and dependent upon the thickness of material 32 processed, the position of the focal optic within its length of travel and the vertical position of cutting head 23 within its length of travel.

In summary, the length of the beam path between the laser output coupler and the workpiece is variable on a flying optics cutting machine. The range of variation of the path length is dependent upon the length of travel along the X, Y, and Z axes. In practical terms, the amount of variation in this Z-axis is insignificant and can be ignored. However in some configurations the amount of variation in the Z-axis is significant and must be compensated. In the configuration shown, the beam path is shortest when cutting head 23 is positioned to the extreme left end of the work support 31, see FIG. 1, and to the extreme right side of the work support 31, see FIG. 3, and when cutting thick material. This area is known as "near field." It is longest when cutting head 23 is positioned to the extreme right end of the work support 31, see FIG. 1, and to the extreme left side of the work support 31, see FIG. 3, and when cutting thin material. This area is known as "far field." In the exemplary machine, the difference in beam path length between those two extremes is a little over 6 meters.

Collimator 22 is provided as a means to vary the divergence of laser beam 60 at the collimator output, and thus to control the size of the beam at the focusing optic 36. The collimator is preferably motorized by means of a servo motor or other precision prime mover, and positioned under CNC control to correct and compensate for changing beam characteristics.

Path length changes of the order noted can have a marked impact on the size of the beam incident on the focusing optic and correspondingly on the shape and position of the focused beam aimed at the workpiece. Observable changes will be noted in the quality of the cut as the cutting head is traversed across the machine from the near field to the far field position.

In accordance with one aspect of the present invention, a control system operates collimator 22 to control beam divergence in such a way as to maintain a controlled beam size at the focusing optic. In the simplest case, the beam size at the focusing optic is controlled to maintain a constant beam size. However, there are cases where the system can introduce controlled variations in beam size to compensate for other variables in the system. Unless the context indicates otherwise, the term "controlled beam size" is intended to encompass both alternatives. In its most preferred form the present invention is utilized with a reflective collimator so as to be able to operate in what is considered a "high power" range, generally above three kilowatts. Transmissive collimators or other transmissive beam correction devices are preferably avoided in high power applications because of the additional thermal lensing and distortion problems they will introduce when attempts are made to operate them at high power levels. A preferred form of collimator 22 is described and claimed in a commonly owned application in the name of Ira E. Cole III, Ser. No. 09/353,936, the disclosure of which is hereby incorporated by reference. Other continuously adjustable collimators can also be used in the practice of the present invention. U.S. Pat. No. 5,442,436 shows an adjustable collimator having four reflective optical elements. Such a collimator, with the addition of a servo motor adapted to drive its adjustment mechanism, could also be used in the practice of the present invention.

A controllable drive system, such as a servo motor and drive, is required to operate a continuously adjustable collimator and thereby correct for beam divergence changes. Other forms of controllable drive systems such as stepper motors, servo controlled linear motors, or servo controlled fluid driven cylinders could be used. Such systems are characterized by the ability to precisely position a driven device such as a collimator. Such servo systems usually include some form of position feedback. Adaptive optics, which alter the curvature of a mirror, may be employed to the same purpose as the collimator, but are very expensive and less robust.

In addition to path length caused changes of beam characteristics, another change is caused by thermal lensing. Thermal lensing is the distortion of an optical component caused by heat absorbed from the input beam. Absorbed heat distorts the optic causing a change in focus characteristics. The rate and amount of distortion is dependent upon the power of the beam, thermal conductivity of the optic and its cooling system and the length of time the beam is on or off. Upon reaching thermal equilibrium, when the absorbed heat is in balance with that removed by the lens cooling system, the shape of the optic surface remains constant. When the beam is turned off, the optic relaxes and returns to its original shape.

Thermal tensing is more pronounced in transmissive optics such as the output coupler of a laser or a focal lens. FIGS. 4a–4d illustrate thermal lensing. FIG. 4a illustrates a laser output coupler 80 which partially reflects and transmits beam 81. As is typical, the inner surface 82 and outer surface 82a are contoured such that transmitted beam 83 has a narrower waist 84 positioned "L" distance from the output coupler and having a diameter 85. FIG. 4b illustrates the effects of thermal lensing. The output coupler expands as heat is absorbed. The original optical surfaces 82a and 82b, shown in dotted lines, are distorted, as shown in solid lines and in an exaggerated fashion as 82c and 82d, thus causing a change in characteristics of output beam 83'. The beam waist 84' is made smaller and shifts ΔL in position.

The change in beam propagation characteristics of an optic operating at various power levels can be determined by test and is substantially repeatable. From test data, it is possible to derive an equation to predict the magnitude of the beam waist shift and divergence change as a function of integrated time and power. As will be described in greater detail below, the present invention provides the ability to combine such information with beam path length information to position a collimator to compensate for and thus correct changes in beam characteristics such that intended characteristics are maintained.

Focal optics are also subject to thermal lensing. FIG. 4c shows a piano-convex focal lens 86 having focal point 87. FIG. 4d shows optic 86' distorted in exaggerated fashion to illustrate thermal lensing and shows a shifted focal point 87'. Distance $d_1$ between focal points 87 and 87' represents the shift in focus caused by thermal lensing in exaggerated fashion. In high power devices this shift can be substantial. For example a plano-convex zinc selenide 10 inch focal length lens subjected to a 6 kilowatt beam 35 mm in diameter was determined to have a focus shift exceeding 6 mm. In the present invention, thermal lensing of the focal optic is compensated separately from thermal lensing of the output coupler and is accomplished by adding a correction signal to the drive system which positions the focal optic.

FIG. 3 shows the cutting head 23 with nozzle 37 positioned over the workpiece 32. The Z-axis driving mechanism is schematically illustrated and identified as $D_1$. That drive moves the cutting head in the vertical, Z-axis direction, and positions the nozzle at a predetermined distance above workpiece 32 for cutting. A second drive, identified schematically as $D_2$ translates the lens carrier 35 within cutting head 23. The lens carrier drive, as it is sometimes referred to herein, adjusts the position of the focal spot relative to the surface of workpiece 32 without changing the position of the nozzle with respect to the same surface. It is used to position the focus spot correctly for piercing and cutting various materials. In some cases the lens is driven downwardly during part of the piercing cycle. In all cases the position of the focal spot has a predetermined desired position. However, thermal lensing will cause an undesirable shift in focal spot position. In accordance with the invention, drive $D_2$ is provided with a Z-axis position command and a Δz position offset which corrects a focus spot shift caused by thermal lensing.

FIG. 5 illustrates, for two different optics, the amount of focal point shift as a function of power incident on the optic. Curve A represents the focal spot shift produced by various power levels from zero through six kilowatts. Curve B represents the same information for a different focal length optic. The invention compensates for such shifts by introducing corrective action.

Compensating for thermal lensing is not a simple steady state problem as suggested in FIG. 5. A lens can be considered a thermal integrator, which stores and releases heat with the rate of change dependent upon the power of the beam, the effectiveness of the cooling system, and duration which the beam is applied. The resulting changes in focus characteristics occur at a rate which can be described by an exponential curve. Typically a laser output coupler will have a time constant on the order of 6 seconds after turn-on before sixty-three percent of the full thermal effect is realized. In FIG. 6 exponential curves $P_1$, $P_2$ and $P_3$ graph the rate of change of beam characteristics based on different average power levels applied to an output coupler. $P_1$ is the lowest power level and $P_3$ is the highest.

Figure 7:
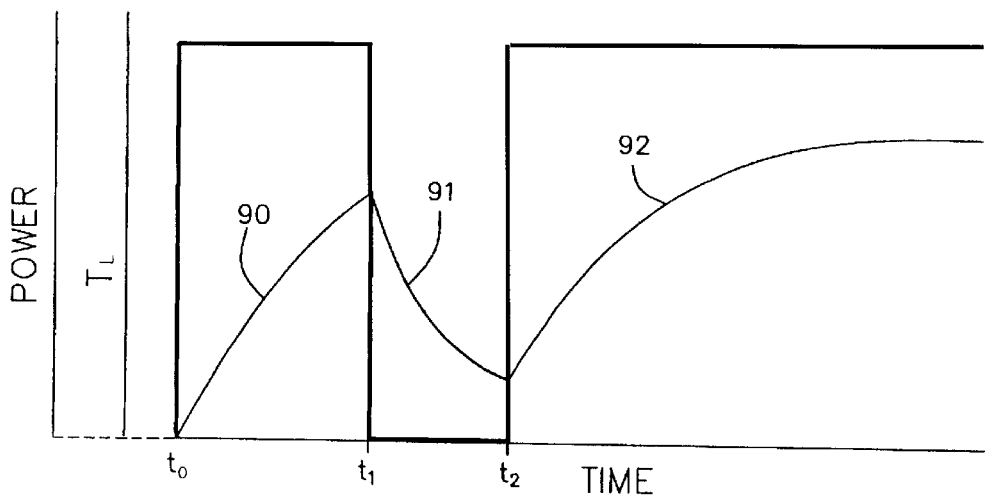
FIG. 7 is a diagram illustrating the thermal loading of a lens, showing the signals applied to the laser and relative distortion in the lens.

Also it must be considered that the laser will not be maintained continuously on, but will be switched on and off for fairly brief intervals. When the laser is switched off, the lens will cool at a rate also describable by an exponential curve. In summary, the amount of thermal distortion of an output coupler or other optic is a variable, dependent upon the power on the optic with the rate of change describable by an exponential function having a time constant matching that of the optic system and dependent on the time which has lapsed after the beam is turned on or off. FIG. 7 shows a power versus time plot for a typical optic, such as a output coupler of a high power laser. Curve segment 90 extending from $t_0$ to $t_1$ shows the rate of thermal buildup in the optic after power is initially applied. At time $t_1$ the laser is switched off. Curve 91 shows the exponential cooling rate of the optic until it reaches $t_2$ at which point the laser is turned on again. Curve 92 shows the rate of thermal buildup from $t_2$. The curve of FIG. 7 can be considered an integrated power time representation of the amount of thermal energy stored in an optic. Such information is used in the practice of the present invention to determine compensation values to correct for thermally caused changes in beam characteristics.

In accordance with the invention, a signal is utilized indicative of the integrated energy level stored in an output coupler, operating between its two steady state energy points of off and fully saturated. In real time, the amount of thermal energy stored in the optic is tracked and determined. That information is used to determine a correction value. The correction value is introduced in real time to a drive system to adjust a collimator optic to correct focal characteristics of the beam. In systems, such as the exemplary one, in which the beam path length changes, the amount of thermal energy stored in the output coupler and the length of the beam path are used in combination and in real time to determine the compensation value. In machine tools having a fixed beam path length only the thermal energy stored in the output coupler would be used to determine the compensation value.

Figure 8:
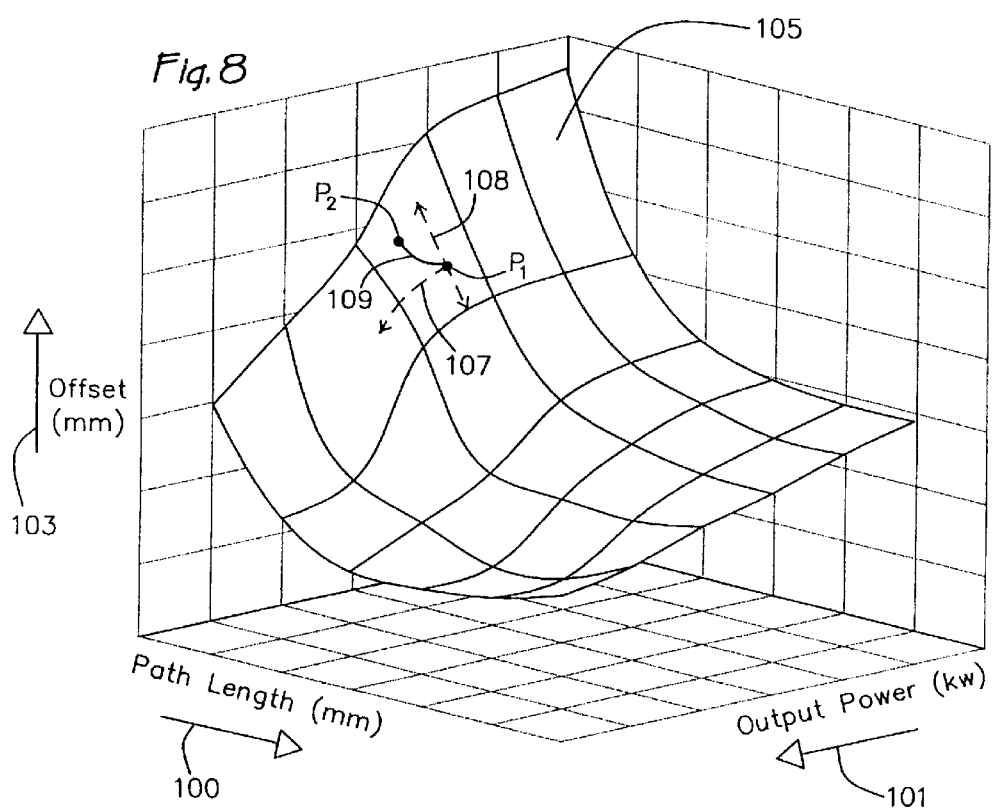
FIG. 8 is a diagram illustrating an example of a three dimensional correction curve as used in the practice of the present invention.

In a currently preferred practice of the invention, a reflective collimator is interposed between the laser and the focusing optic, and has an adjustment mechanism operated to compensate for both thermal lensing changes and path length changes. The nature of the changes can be conceptualized as introducing a correction based on a three-dimensional curve, a form of which is illustrated in FIG. 8. Turning to FIG. 8, a three axis grid is shown in which a first axis 100 defines path length changes from a fixed reference, such as zero, at the ordinate to the maximum path length change. Thus, the workhead in the shortest path length position, corresponds to a point on the axis 100 at the ordinate, and movement of the workhead in directions which increase the path length move the point in the direction of the arrow 100.

Integrated output power in units such as kilowatts, is plotted along the axis 101. The minimum power point is at or near the ordinate, and increasing power levels are displaced from the ordinate in the direction defined by arrow 101. The output power plotted along this axis is the integrated output power at any given point in time, such as is shown in FIG. 7.

The third axis in the three-dimensional plot is the offset for the collimator. The offset in one example has a zero position at the ordinate and increasing positive deviation indicated by the arrow 103. The scale can also be arranged with zero offset at an intermediate position providing both positive and negative offsets on respective sides of the zero point.

FIG. 8 has a three-dimensional surface 105 plotted thereon which is the relationship between output power, path length, and collimator offset for a particular machine tool. Thus, it is known that for any given amount of integrated energy in the optic and for any given path length in the machine, the collimator will need to be adjusted by the appropriate offset defined by the surface 105 in order to maintain the beam waist (FIGS. 4a and 4b) at the appropriate size and position, in order to keep the size of the laser beam incident on the focusing optic at the desired diameter. As will be clear from FIG. 7 the integrated output power in the lens will change over time based on whether the laser is on or off, and thus the input along the axis 101 will be continuously changing as the laser beam is triggered. Similarly, the path length will be changing as the workhead is traversed to cut a particular part, causing the path length along the axis 100 to be continuously changing. As a result, the three-dimensional relationship identified by the surface 105 will cause the resulting offset to be continuously changing, and the offset will be coupled to a servo or other prime mover in the collimator to continuously and in real time adjust the collimator to maintain the beam size on the focusing optic at the desired size.

Consider for example that at a given instant in time the operating conditions for the system are defined by a point $P_1$ on the surface 105. That demands a given offset as determined by the three-dimensional relationship. As the laser remains on, however, thermal loading will increase and the operating point will begin to move in the direction indicated by the arrow 107. Similarly, as the cutting head is traversed the operating point PI will move in one direction or the other as indicated by the double headed arrow 108. The result may, for example, be a movement of the point from $P_1$ to $P_2$ along the path 109. That requires a continuous change in offset which is communicated to the collimator in order to maintain the beam size at the required level.

To correct for thermal lensing of the focusing optic integrated power-time information for that optic is utilized to determine a compensation value which is introduced in real time to lens driving system to correct and thereby maintain the intended position of the focal spot. In the illustrated embodiment the correction signal is added as an offset to the signal which drives the servo which controls the position of lens carrier 35 in cutting head 23. In other systems, such as those using adaptive optics, the shift signal can be used as an offset in the controller for the adaptive optic. In some cases, the shift signal can also be used as an offset for the Z-axis control of the cutting head.

When compensations are made for both the output coupler and the focal optic, the position of the focal point relative to the workpiece is rendered substantially consistent regardless of the position of the cutting head, regardless of the operating power level, regardless of the steady state conditions of beam full on and off, and regardless of the intermediate conditions between those steady states.

Figure 9:
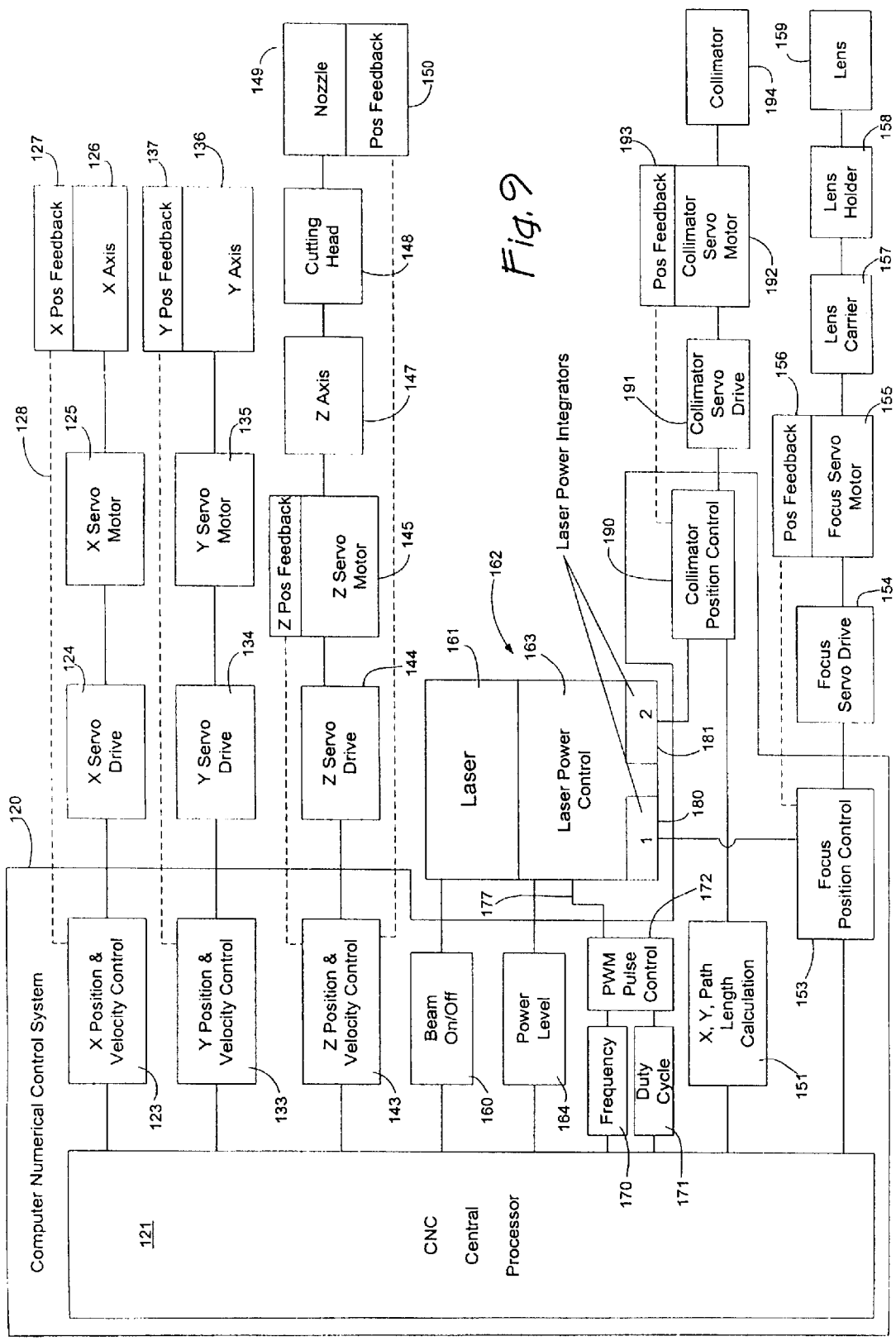
FIG. 9 is a block diagram illustrating a control system exemplifying the present invention.

Turning now to FIG. 9, there is shown a block diagram for a control system adapted to make the aforementioned corrections in accordance with the present invention. A computer numerical control system 120 is represented by the large block, with a number of functional blocks within it. The CNC central processor 121 is separately illustrated, although it will be appreciated by those skilled in the art that many of the functions separately illustrated within the block 120 are performed in whole or in part by the CNC central processor. They are shown separate in FIG. 9 as an aid in understanding the present invention.

The illustrated numerical control system is a four axis device, with conventional X, Y and Z axes and a fourth axis parallel to the Z-axis devoted to the position of the lens carrier. The invention can be applied with more or fewer axes. The CNC system 120 includes a position and velocity control module for each of the X, Y and Z axes. Thus, an X position and velocity control module 123 responds to signals from the central processor 121 to control an X-axis servo drive 124 which in turn controls the X-axis servo motor 125. The position of the bridge along the X-axis is represented by the box 126, and it is seen that a feedback position element 127 has an output 128 connected as a feedback input to the X position and velocity control module 123. Thus, the CNC is capable of driving the bridge along the X-axis to any coordinate and at any selected velocity in a conventional fashion.

A Y position and velocity control module 133 has associated elements including a Y-axis servo drive 134 and a Y-axis servo motor 135 which control the position of the cutting head along the Y-axis 136. Position feedback element 137 provides feedback to the Y position and velocity control module 133. The Z position and velocity control module 143 is similar to the X and Y modules in the present embodiment, in that is acts through a Z-axis servo drive 144 upon a Z-axis servo motor 145. In this case, however, the servo motor 145 has feedback element 146 associated directly with the motor, and that position feedback is coupled back to the feedback input of the Z position and velocity control module 143. The Z-axis position is represented by the block 147, and the block 148 indicates that it is the cutting head 148 which is positioned along the Z-axis, and more particularly the nozzle which is represented by the block 149. Additional position feedback 150 is provided from the nozzle and coupled back to the Z position and velocity control module 143. The cutting head can have, for example, position feedback dependent on the proximity to the workpiece which obviously can vary in thickness. Thus the position feedback element 146 can respond in absolute coordinates to the position of the drive, whereas the feedback position element 150 may respond in terms of the position of the nozzle 149 with respect to the workpiece.

In practice, whenever a cut is to be made, the CNC central processor 121 operates through the modules 123, 133, and 143 to position the cutting head with the nozzle above a selected point on the workpiece. Piercing is accomplished and then the nozzle is traversed across the workpiece in directions coordinated to the shape and size of the part to be cut, with the laser beam switched on and off during the traverse of the cutting head to cut the appropriate part.

In practicing the invention the numerical control system 120 includes a module 151 which operates in conjunction with the modules 123 and 133 to determine an X, Y path length calculation for purposes of compensating for the beam path. Thus, the modules 123 and 133 have precise information on the position of the cutting head with respect to the workpiece, and thus have the information necessary to calculate the path length or deviations in the path length from a set or home position. The module 151 performs that computation to produce the path length correction which is one of the inputs to the three-dimensional correction of FIG. 8.

The CNC central processor 121 also has the capability of positioning the lens holder along the Z-axis. This is, in effect, a fourth numerically controlled axis, sometimes called the U-axis. A focus position control module 153 similar to the modules 123, 133, and 143, responds to commands from the central processor 121 to control the position of the lens carrier within the cutting head. An output signal from the module 153 is coupled to a focus servo drive 154 and which controls a focus servo motor 155. The servo motor 155 has a feedback module 156 associated therewith which couples a position feedback signal to the module 153. The servo motor 155 controls the vertical position of the lens carrier represented by the block 157 which carries the lens holder represented by the block 158 which in turn carries the lens represented by the block 159.

Thus, as so far described, the focus position control operates in a similar fashion to the Z position control module 143 to control the position of the lens within the cutting head. Operation of the focus position control 153 with the Z position maintained constant will tend to shift the focus point either toward or away the workpiece depending on the direction of controlled movement.

The CNC central processor 121 also controls certain aspects of the laser operation, including laser beam on/laser beam off, the power level at which the laser is commanded to operate, and in cases of pulse width modulated control of the laser, the frequency and duty cycle of the pulse width modulated output. Thus, the CNC central processor 121 is coupled to a beam on/off control module 160 which in turn is coupled to a laser control processor 161 in the laser control module generally indicated at 162. The laser processor 161 accepts signals from a numerical controller to take such actions as turning the beam on and off. The module 160 is adapted to send those signals to the computerized control 161 which then responds by controlling the on or off state of the beam. The control module 162 also includes a laser power control unit 163. The CNC processor 121 has associated therewith a power level control module 164 which is an interface to the laser power control processor 163. Thus, if a particular cut is to be made with the laser beam set at 3000 watts, for example, the processor 121 will output data to the power level control module 164 indicating that the laser power control 163 is to be instructed to operate the laser at the 3000 watt level. The module 164 thereupon sends a signal to the laser power control unit 163 which causes the processor within the module 163 to operate the laser with a 3 kW output.

For operating the laser beam under pulse width modulated control, the CNC processor 121 has interface elements including a frequency control module 170, a duty cycle control module 171, and a pulse width modulated pulse control 172 to set the frequency of the on and off periods and the duty cycle within that frequency at which the laser beam is to be operated. The frequency is set by way of interface module 170 and the duty cycle by way of interface module 171. Those signals are combined in the pulse width modulated pulse control interface element 172 to produce a duty cycle output signal on a line 173 which is coupled to the laser power control computer 163 for pulsing the laser on and off for a given duty cycle at a given frequency as demanded by the CNC central processor 121.

In practicing the invention, a pair of laser power integrators 180, 181 are provided for monitoring the energy stored within two different optical elements in the system. In the typical application, the modules 180 and 181 will have different time constants and different energy levels, and will be associated with particular optical elements in the system to monitor the stored energy condition of the those elements. Recalling FIG. 7, it will be seen that the integrators 180 and 181 are capable of monitoring the position along the curve relating time to stored energy. Thus, an output signal from the integrator will continuously indicate the energy stored within the associated optical element in real time.

In the illustrated embodiment, the integrator 181 is associated with the output coupler of the laser. It may have, for example, a time constant in the range of six to ten seconds and be capable of indicating the stored energy in the optic associated with the output power level typically to a maximum power on the order of 5 kw. It is recalled that the curve of FIG. 7 is intended to illustrate the energy stored in the laser output coupler, and thus the integrator 181 monitors the on and off intervals of the laser during normal and PWM operation. The integrator 181 has stored therein a curve which represents the energy storage and energy released values and time constants for the associated optical elements and thereupon integrates positively to increase the stored energy level whenever the laser is on, (such as illustrated at 90 and 92 of FIG. 7), and integrates negatively to decrease the stored energy level, (such all illustrated at 91 of FIG. 7), whenever the laser is off. Thus, curves such as illustrated in FIG. 7 will be generated over time by the integrator 181 and will serve as a measure of the energy stored within the laser output coupler.

The integrator 180 is similar in construction but will typically have a different time constant associated therewith. In the preferred embodiment the integrator 180 is associated with the focus optic. As such it may often have a time constant which is much nearer twenty seconds than the six seconds of the focus optic. However, it will have an exponential build-up and exponential decay, much as the output coupler Since it is not typical to associate a cooling system with a focus optic, the cooling curve may be somewhat shallower than the warming curve. However, those conditions will be determined by experiment for a particular set of hardware, to produce a particular set of parameters which generate a curve such as that illustrated in FIG. 7, but with values and constants defined by the physical response of the particular optic to incident laser energy at given power levels. It is also noted that oftentimes a laser will have a shutter which will be closed at times even with the laser beam on. In those conditions, the output coupler will typically have energy incident thereon, but the focus optic will not, so the integrators will be operating under different conditions.

In practicing the preferred embodiment of the present invention, the path length determination made by module 151 is combined with the integrated energy information collected by integrator 181 to determine from a characteristic such as the aforementioned three-dimensional relationship, a position control correction to be introduced into the laser beam by way of the collimator 22. Thus, a collimator position control module 190 has a first input coupled to the energy integrator 181, and a second input coupled to the X, Y path length calculation module 151. The collimator position and control module 190 has data stored therein data corresponding to the three-dimensional relationship of FIG. 8 or a pair of two-dimensional equivalents thereof, and produces an output representing a correction signal to be sent to the collimator. In the present embodiment that output is produced as an offset signal on a signal line coupled to the collimator servo drive 191. The drive 191 operates the collimator servo motor 192 which in turn positions the collimator 194 to adjust the divergence of the laser beam so as to maintain a beam size of the desired dimension at the focus optic. The collimator servo motor 192 has a position feedback element 193 associated therewith which returns a feedback signal to the collimator position control 190.

The focus optic integrator 180 has an output coupled as an input to the focus position control 153. It is recalled that the position control 153 operates on a primary signal from the CNC central processor 121 to control the position of the lens 159. An offset signal is provided by the integrator 180 which serves to modify the output signal of the focus position control in accordance with the energy stored in the focus optic. Thus, the output signal from the focus position control 153 is modified to take account of the distortion of the focus optic caused by the laser beam of particular power incident thereon for its actual on and off times. That offset adjusts the output signal of the focus position control so that the actual position of the lens 159 is adjusted in accordance not only with the machine position commands of the CNC central processor 121, but also to correct for distortion in the optics created by the laser beam passing through the focus optic at particular power levels for particular lengths of time.

In summary, the control system illustrated in FIG. 9 operates in a conventional fashion to traverse the cutting head over the workpiece and to control the power level and on and off condition of the laser beam to cut parts from the workpiece. In addition, the laser power control 163 has a pair of integrators associated therewith to integrate the stored energy in the two primary devices which will distort as a result of high power laser energy being incident thereon. In connection with the output coupler, the energy is integrated according to the power level set for the laser and the actual on and off intervals for the laser, and that signal is coupled along with a beam path length correction to operate through a three-dimensional correction curve to adjust the collimator so as to maintain a constant beam size at the focus optic for all positions of the cutting head and all possible states of distortion of the output coupler. Thus, as the CNC controller 121 operates the cutting head to move it across the workpiece to cut particular shapes, the path length calculation is continuously made by the module 151 and the collimator position control is continuously adjusted to maintain the desired spot size at the focus optic, all in real time. Similarly, as the laser is on for longer periods of time and tends to increasingly distort the output coupler until equilibrium is reached, a signal is produced by the integrator 181 to also adjust the collimator to take account of the distortion of the output coupler occasioned during the cut.

In addition, also in real time, a second integrator with a separate time constant maintains the integrated energy level of the focus optic and couples that signal through a focus position controller 153 to separately adjust the position of the lens with respect to the workpiece. Thus, for example, the first correction control system maintains a constant spot size or beam diameter on the focus optic, and the second control system which takes account of distortion in the focus optic adjusts the focus of that optic to maintain the spot size where the CNC central processor 121 commanded it to be.

It will be noted that in less complex environments, the invention continues to have utility, but in perhaps less significant ways. For example, if a constant path length machine it utilized, the input from the X, Y path length calculation 151 is a constant, and therefore the collimator position control 170 need respond only to a single input from the integrated power applied to the output coupler.

It was also noted at the outset that the present invention is applicable to laser welders as well as laser cutters, although the preferred embodiment has been described in connection with a laser cutting machine. The workhead position controls modules, the beam on/off control modules, and the path length calculations are all applicable to laser welding machines, and those skilled in the art will appreciate based on a description of the invention and particularly that of FIG. 9, that the control system described herein is fully applicable to both classes of machines.

What is claimed is:

1. A method of real time control of beam characteristics in a high power laser-equipped machine tool, the machine tool being of the tape having a processing head movable in at least one plane to define a processing path over a workpiece, a focus optic in the processing head receiving a beam from the laser via a laser output coupler and producing a focused beam, and a focus adjustment mechanism for the focus optic for setting the position of the focal point with respect to the workpiece, the method comprising the steps of:

producing a beam path input signal related to changes in the length of the laser beam path as the processing head moves over the workpiece;

integrating the on and off intervals and the laser beam power level as applied to the laser output coupler with a time constant for the integration being related to a thermal time constant of the output coupler to produce a thermal input signal;

using the beam path input and thermal input signals in a three dimensional relationship to determine a correction;

continually producing updated beam path input signals, thermal input signals, and the resulting correction which varies in real time with said beam path and thermal input signals;

applying the varying correction in real time to adjust beam divergence to maintain a controlled beam size at the input of the focus optic;

integrating the on and off intervals and the laser beam power level as applied to the focus optic with a time constant for the integration being related to the thermal time constant of the focus optic; and continually computing a focus position correction based on the last mentioned integration and applying said correction to the focus adjustment mechanism to eliminate any shift in position of the focal point due to thermal lensing of the focus optic to thereby maintain the position of the focal spot relative to the workpiece.

2. The method of claim 1 in which the step of applying the correction to adjust beam divergence comprises applying the correction to a motorized reflective collimator having no lenses which would cause thermally induced distortion in the high power laser beam.

3. The method of claim 1 in which the step of applying said correction to the focus adjustment mechanism comprises adjusting the processing head with respect to the workpiece.

4. The method of claim 1 in which the step of applying said correction to the focus adjustment mechanism comprises adjusting the position of the focus optic with respect to the workpiece while maintaining the position of the processing head with respect to the workpiece constant.

5. A method of real time control characteristics in a high power laser-equipped machine tool, the machine tool being of the type having a processing head movable in at least one plane to define a processing path over a workpiece, a focus optic in the processing head receiving a beam from the laser via a laser output coupler and producing a focused beam, the method comprising the steps of:

continually producing beam path input signals related to changes in the length of the laser beam path as the processing head moves over the workpiece;

continually integrating the on and off intervals and the laser beam power level as applied to the laser output coupler with a time constant for the integration being related to the thermal time constant of the output coupler to produce a thermal input signal;

using the beam path input signals and thermal input signals in a three-dimensional relationship to produce a correction in real time in accordance with beam path errors caused by path length changes and by thermal lensing;

applying the correction to an adjustable collimator, the collimator comprising a plurality of coupled mirrors having no transmissive optics capable of introducing thermal lensing errors; and adjusting the collimator in proportion to the varying correction to adjust the beam divergence to correct for said beam path errors.

6. A method of real time control of beam characteristics in a high power laser-equipped machine tool, the machine tool being of the type having a processing head movable in at least one plane to define a processing path over a workpiece, a focus optic in the processing head receiving a beam from the laser via a laser output coupler and producing a focused beam, a focus adjustment mechanism for the focus optic for setting the position of the focal point with respect to the workpiece, and an adjustable collimator interposed between the laser and the processing head for adjusting beam divergence, the method comprising the steps of:

producing a beam path input signal related to changes in the length of the laser beam path as the processing head moves over the workpiece;

integrating the on and off intervals and the laser beam power level as applied to the laser output coupler with a time constant for the integration being related to a thermal time constant of the output coupler to produce a thermal input signal;

continually computing a collimator correction based on the beam path input signal and the thermal input signal, the collimator correction being of a magnitude and sense capable of correcting for path length changes and thermal lensing under all operating conditions of the laser and the machine tool;

applying the correction to the collimator in real time to adjust the beam divergence to maintain a controlled beam size at the input of the focus optic;

integrating the on and off intervals and the laser beam power level as applied to the focus optic with a time constant for the integration being related to the thermal time constant of the focus optic; and continually computing a focus position correction based on the last mentioned integration and applying said correction to the focus adjustment mechanism to eliminate any shift in position of the focal point due to thermal lensing of the focus optic to thereby maintain the position of the focal spot relative to the workpiece.

7. A method of real time control of beam characteristics in a high power laser-equipped machine tool, the machine tool being of the type having a focus optic in the processing head receiving a beam from the laser via a laser output coupler and producing a focused beam, a focus adjustment mechanism for the focus optic for setting the position of the focal point with respect to the workpiece, and an adjustable collimator interposed between the laser and the processing head for adjusting beam divergence, the method comprising the steps of:

integrating the on and off intervals and the laser beam power level as applied to the laser output coupler with a time constant for the integration being related to a thermal time constant of the output coupler and its cooling system to produce a thermal input signal;

continually computing a collimator correction based on at least the thermal input signal and applying said correction to the collimator to maintain a desired beam size at the input of the focus optic;

integrating the on and off intervals and the laser beam power level as applied to the focus optic with a time constant for the integration being related to the thermal time constant of the focus optic; and continually computing a focus position correction based on the last mentioned integration and applying said correction to the focus adjustment mechanism to eliminate any shift in position of the focal point due to thermal lensing of the focus optic to thereby maintain the position of the focal spot relative to the workpiece.

8. A real time beam control system for a laser-equipped machine tool including a laser projecting a beam via a laser output coupler through a collimator to a focusing optic in a processing head which produces a focused beam having a focal point at a predetermined location with respect to the workpiece, and having a focus positioning mechanism for adjusting the position of the beam focal point with respect to the workpiece, the real time beam control system comprising in combination:

a path length control system responsive to changes in the length of the beam path due to movement of the processing head, for adjusting the collimator to correct beam characteristics for path length changes;

a thermal control system having a time constant characteristic coordinated to the thermal time constant of the laser output coupler, the thermal control system including an integrator which integrates the output power history of the output coupler, for adjusting the collimator to compensate for thermal lensing of the output coupler; and a processing optic thermal lensing control system having a time constant characteristic coordinated to the thermal time constant of the focal optic, said last mentioned system having an integrator which integrates the input power history applied to the focal optic, for adjusting the focus mechanism to compensate for focus position shifts due to thermal lensing of the focal optic and thereby eliminate any such shift.

9. The combination of claim 8 wherein the integrated power history of the laser output coupler includes information on the operating power level of the laser and information on the on or off state of the laser beam through the output coupler.

10. The combination of claim 9 wherein the integrated power history of the focus optic includes information on the power level of the laser and information on the on or off state of the laser beam at the focal optic.

11. A method of real time control of beam characteristics in a high power laser-equipped machine tool, the machine tool being of the type having a laser producing an output beam passed through an output coupler having a maximum output power level of at least about 3 kilowatts, a processing head movable in at least one plane to define a processing path over a workpiece, and a focus optic in the processing head for producing a focused beam, the method comprising the steps of:

provining an adjustable optical system defining a beam path between the laser output coupler and the focus optic, said adjustable optical system having no transmissive optics;

continually producing beam path input signals related to changes in the length of the beam path as the processing head moves over the workpiece;

continually integrating the on and off intervals and the laser beam power level as applied to the laser output coupler with a time constant for the integration being related to the thermal time constant of the output coupler to produce a thermal input signal;

continually computing a collimator correction based on the beam path input signals and thermal input signals to produce a correction signal in accordance with beam diameter errors caused by path length changes and by thermal lensing;

applying the correction in real time to an electronically responsive reflective collimator in the adjustable optical system, the collimator comprising a plurality of coupled mirrors having no transmissive optics capable of introducing thermal lensing errors; and adjusting the collimator in proportion to the varying correction signal to adjust the beam divergence to correct for said beam path length changes and thermal lensing.

12. The method of claim 11 in which the step of providing an adjustable optical system comprises providing an adjustable collimator having at least 2 and no more than 3 mirrors, and a motorized mirror drive coupled to adjust the relative position between the mirrors to controllably adjust divergence of the beam output from the collimator.

13. The method of claim 12 in which the machine tool further includes a motorized control for adjusting the focus optic with respect to the workpiece, and the step of continually integrating includes integrating the on and off intervals as applied to the focus optic with a time constant for the integration being related to the time constant of the focus optic.

* * * * *

UNITED STATES PATENT AND TRADEMARK OFFICE
CERTIFICATE OF CORRECTION

PATENT NO. : 6,392,192 B1  
DATED : May 21, 2002  
INVENTOR(S) : Ira E. Cole III and William B. Scott It is certified that error appears in the above-identified patent and that said Letters Patent is hereby corrected as shown below:

<u>Column 16,</u>
Line 65, after "control", insert -- of beam --

Signed and Sealed this

Twenty-ninth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,392,192 B2 Page 1 of 1
APPLICATION NO. : 09/396954
DATED : May 21, 2002
INVENTOR(S) : Ira E. Cole, III and William B. Scott It is certified that error appears in the above-identified patent and that said Letters Patent is hereby corrected as shown below:

Column 16

Line 14, delete the word "tape" and insert --type--

Signed and Sealed this

First Day of May, 2007

JON W. DUDAS
*Director of the United States Patent and Trademark Office*